United States Patent
Lawrence

(10) Patent No.: US 7,448,313 B2
(45) Date of Patent: Nov. 11, 2008

(54) DUAL LINE CONVEYOR SYSTEM AND METHOD

(75) Inventor: Eric Clay Lawrence, South El Monte, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 0 days.

(21) Appl. No.: 10/595,318

(22) PCT Filed: Oct. 8, 2004

(86) PCT No.: PCT/US2004/033343

§ 371 (c)(1),
(2), (4) Date: Apr. 7, 2006

(87) PCT Pub. No.: WO2005/034634

PCT Pub. Date: Apr. 21, 2005

(65) Prior Publication Data

US 2008/0073178 A1    Mar. 27, 2008

Related U.S. Application Data

(60) Provisional application No. 60/481,497, filed on Oct. 10, 2003.

(51) Int. Cl.
*A47J 37/00* (2006.01)
(52) U.S. Cl. .......................... 99/349; 99/353

(58) Field of Classification Search ........... 99/325–333, 99/337, 338, 468, 485–491, 349, 450.1, 450.2, 99/450.6, 450.7, 352–355; 425/110, 112, 425/308; 426/138, 297, 283, 502, 512, 514
See application file for complete search history.

(56) References Cited

U.S. PATENT DOCUMENTS

| | | | | |
|---|---|---|---|---|
| 3,953,613 | A * | 4/1976 | Morgenthaler et al. | 426/502 |
| 3,993,422 | A * | 11/1976 | Riviere et al. | 425/304 |
| 4,318,678 | A * | 3/1982 | Hayashi et al. | 425/301 |
| 4,668,524 | A | 5/1987 | Kirkpatrick | |
| 4,741,263 | A * | 5/1988 | Ueno et al. | 99/450.2 |
| 4,905,583 | A * | 3/1990 | Hayashi | 99/450.2 |
| 4,938,126 | A | 7/1990 | Rubio | |
| 4,996,915 | A * | 3/1991 | Morikawa et al. | 99/450.2 |
| 5,018,439 | A * | 5/1991 | Bordin | 99/450.2 |
| 5,088,391 | A * | 2/1992 | Anderson | 99/423 |

(Continued)

FOREIGN PATENT DOCUMENTS

GB    912637    12/1962

*Primary Examiner*—Timothy F. Simone
(74) *Attorney, Agent, or Firm*—Robert J. Rose; Sheldon Mak Rose & Anderson PC

(57) ABSTRACT

An apparatus for combining delivery of objects from a first transport conveyor (34) and a second transport conveyor (40), comprising a first continuous discharge conveyor (36), a second continuous discharge conveyor (42) which is rotatable about a longitudinal axis; means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the objects therebetween; and means for synchronizing the pivoting means with discharge of the objects from the first discharge conveyor and the second discharge conveyor.

11 Claims, 3 Drawing Sheets

U.S. PATENT DOCUMENTS

| | | |
|---|---|---|
| 5,231,919 A | 8/1993 | Lawrence |
| 5,388,503 A * | 2/1995 | Buerkle ..................... 99/349 |
| 5,501,140 A | 3/1996 | Balleza et al. |
| 6,263,789 B1 * | 7/2001 | Karner ..................... 99/450.6 |
| 7,097,026 B2 * | 8/2006 | Lawrence ................ 198/690.1 |

* cited by examiner

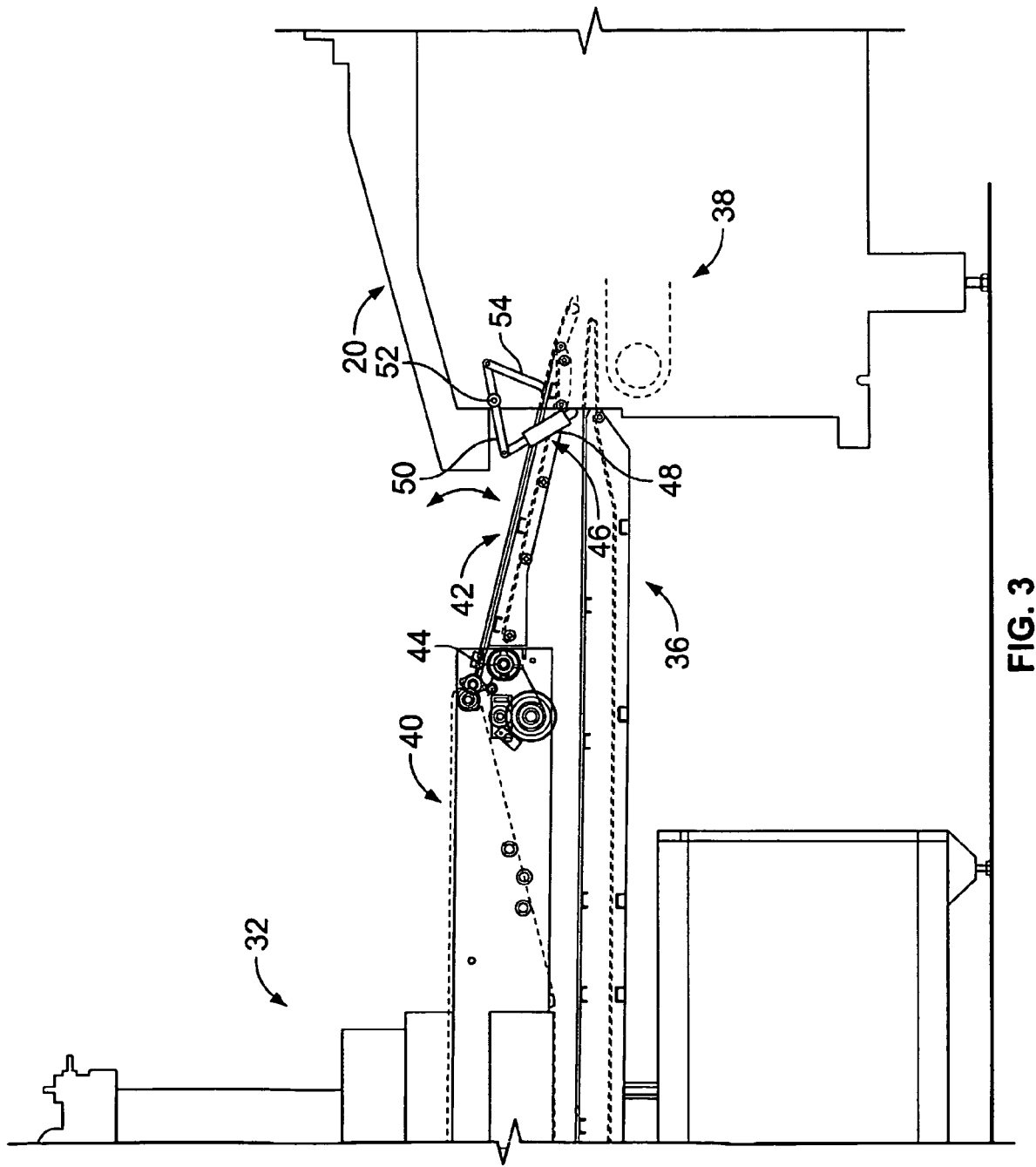

US 7,448,313 B2

DUAL LINE CONVEYOR SYSTEM AND METHOD

CROSS-REFERENCE TO RELATED APPLICATION

The present application claims the benefit of U.S. Provisional Patent Application No. 60/481,497, filed on Oct. 10, 2003, entitled PRODUCTION LINE CONVEYOR SYSTEM, the entire contents of which are hereby incorporated herein by reference.

BACKGROUND

The present invention is directed to a production line system and more specifically, to a production line system allowing the use of two or more presses in a single conveyor system.

Production lines for making flour tortillas are known which utilize a single press. In a single press system, a conveyor takes pressed pieces from the single press into an oven.

However, the press is cyclically operated, requiring a delay while new balls of dough are brought to the press and while the pressed pieces are removed from the press. Therefore, there is a time gap between groups of pressed pieces reaching the oven, leading to inefficiency.

Previous systems that have attempted to combine the output of multiple presses in a single conveyor system have required close synchronization between discharge conveyors and a third deposit conveyor. Synchronization requires costly components, necessitates costly and time consuming adjustments, and limits the flexibility of the system.

Thus, there is a need for an improved dual line conveyor system to remedy the defects of the prior art. Moreover, the need extends beyond cooking systems to other types of processes where conveyors are used with cyclic devices, such as with cooling systems and assembly systems.

SUMMARY

Accordingly, the present invention, in an embodiment, is directed to an apparatus for combining delivery of first objects from a first transport conveyor with second objects from a second transport conveyor, comprising a first continuous discharge conveyor for transporting the first objects received from the first transport conveyor, comprising a discharge end; a second continuous discharge conveyor for receiving the second objects from the second transport conveyor, comprising a receiving end with a longitudinal axis, and a discharge end, and being rotatable about the longitudinal axis; means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and means for synchronizing the pivoting means with discharge of the first objects from the first discharge conveyor and discharge of the second objects from the second discharge conveyor.

In one embodiment, a linear actuator is used for the pivoting means, and the synchronizing means comprises a logic controller. In further embodiments the first objects and second objects are tortillas, and the first and second transport conveyors are tortilla press conveyors.

A system for pressing tortillas is disclosed comprising a first tortilla press for pressing dough into first tortillas, having a first press conveyor; a first continuous discharge conveyor for transporting the first tortillas received from the first press conveyor, comprising a discharge end; a second tortilla press for pressing dough into second tortillas, having a second press conveyor; a second continuous discharge conveyor for receiving the second tortillas from the second press conveyor, comprising a receiving end with a longitudinal axis, and a discharge end, and being rotatable about the longitudinal axis; means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and means for synchronizing the pivoting means with the first press conveyor, the first discharge conveyor, the second press conveyor, and the second discharge conveyor.

In one embodiment of the system a linear actuator is used for the pivoting means, and the synchronizing means comprises a logic controller.

A method for combining delivery of first objects from a first transport conveyor with second objects from a second transport conveyor is described, comprising the steps of receiving the first objects from the first transport conveyor onto a first continuous discharge conveyor having a discharge end; receiving the second objects from the second transport conveyor onto a second continuous discharge conveyor comprising a receiving end with a longitudinal axis, and a discharge end; intermittently pivoting the second continuous discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween, synchronizing the pivoting of the second continuous discharge conveyor with the first discharge conveyor and the second discharge conveyor; discharging the first objects from the first discharge conveyor while the second discharge conveyor is in the upper position, and discharging the second objects from the second discharge conveyor while the second discharge conveyor is in the lower position.

The method may be used in various embodiments, for example where the first objects and second objects are pressed dough, and the first and second transport conveyors are press conveyors.

BRIEF DESCRIPTION OF THE DRAWINGS

A better understanding of the present invention will be had with reference to the accompanying drawings in which:

FIG. 3 is an enlarged side elevation view of a portion of FIG. 2.

DETAILED DESCRIPTION

Figure 1:
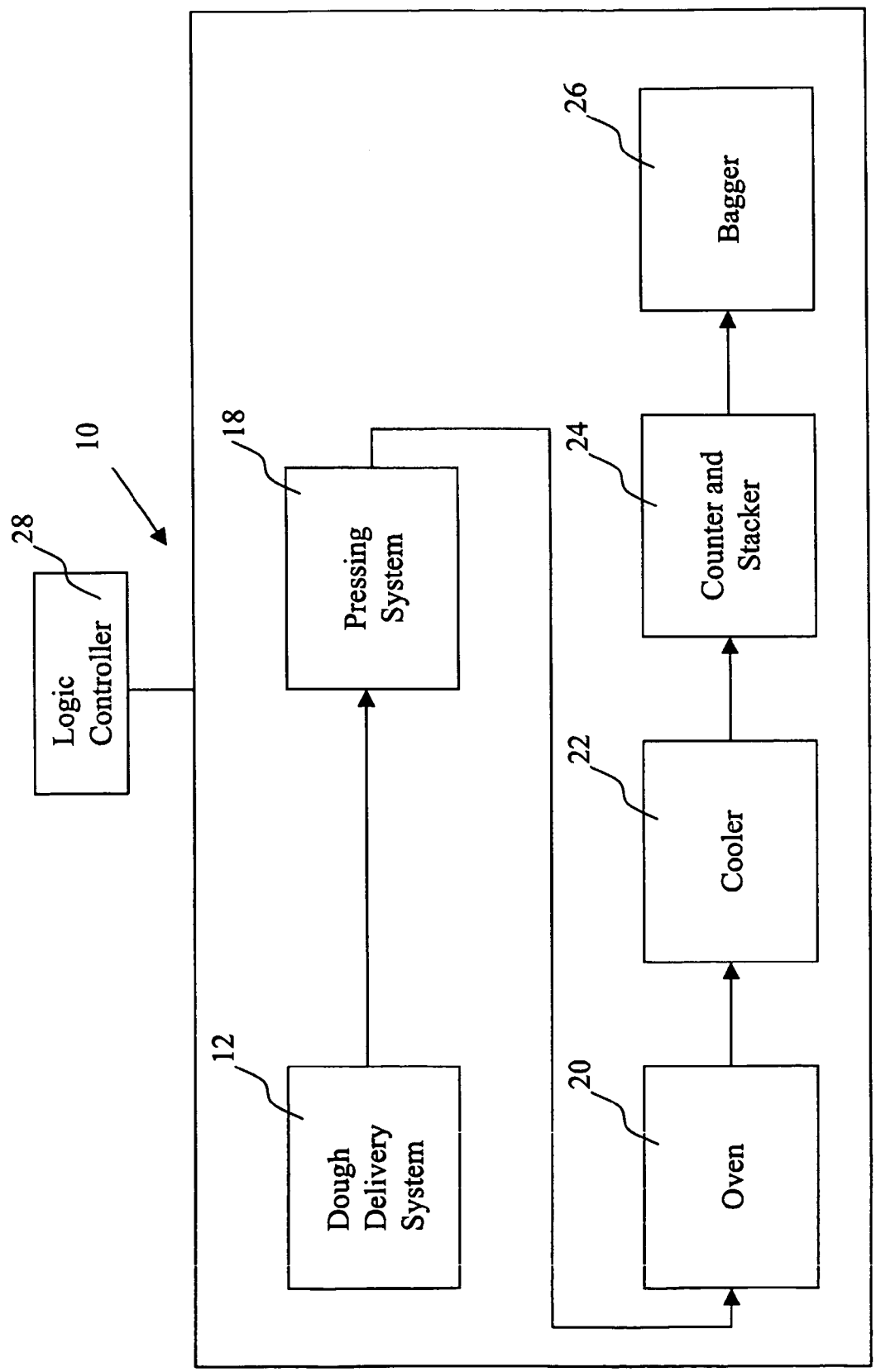
FIG. 1 is a schematic diagram of a system for making tortillas, including a system for pressing tortillas according to an embodiment of the present invention.

Turning now to the figures, FIG. 1 is an overview of a tortilla making system 10 according to an embodiment of the present invention. Initially, the ingredients that make up the tortillas are mixed and delivered to a pressing system 18 by a dough delivery system 12.

Typically this might include a mixer, a divider and shaper which separates the dough into individual units, and a positioner which places the units onto a conveyor in a predetermined pattern with a predetermined spacing. The units are then forwarded through a pressing system 18 where the units are pressed into pressed pieces.

The pressed pieces are then forwarded to an oven 20 where the pieces are cooked. The cooked pieces are then forward to a cooler 22. Typically, the cooler 22 has a serpentine path crossing back and forth through an area of ambient or reduced temperature. The cooled pieces are forwarded to a counter-stacker 24. A counter-stacker suitable for use in the present invention is disclosed in U.S. Pat. No. 6,585,477 for a "Counter-stacker for flat food products", which is incorporated herein by reference.

Once a stack contains the proper number of pieces, the stack is forwarded to a bagger 26 where the stack is placed in a sealed bag for distribution. Additional devices, such as size and shape checking devices, may be added to the system to improve quality control.

All of the previously listed components are preferably coupled to a logic controller 28 which can adjust, for example, one or more of the ingredient mixture, the press rate, the oven temperature, and the flow of pieces between system components. Appropriate mixers, divider and shapers, positioners, ovens, coolers, counters and stackers, and baggers are known to those skilled in the art and will not be further discussed here.

Figure 2:
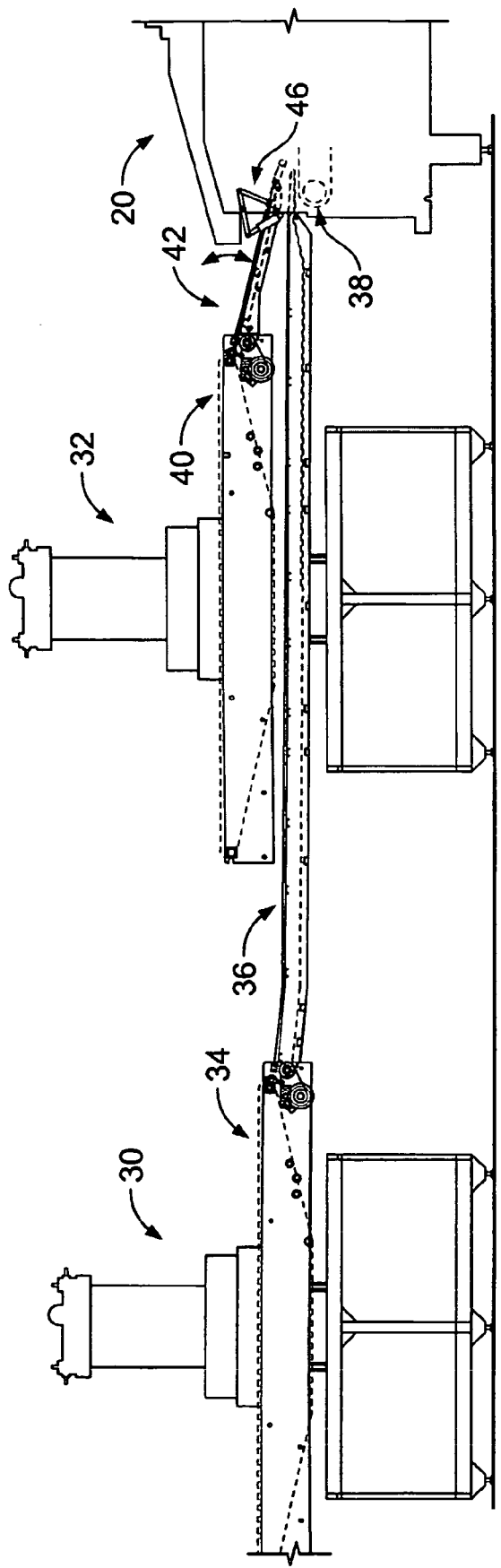
FIG. 2 is a schematic side elevation view of a dual press system using an embodiment of the present invention.

The pressing system 18 will now be considered in more detail with reference to FIG. 2 and FIG. 3. The units (also referred to as "objects") are forwarded from the positioner to both a first press 30 and a second press 32. The first press 30 flattens the objects into pressed pieces, and passes the pieces along a first transport conveyor, in this case a first press conveyor 34. The first press conveyor 34 passes the pressed pieces onto a first discharge conveyor 36. The first discharge conveyor 36 directs the pressed pieces onto an oven conveyor 38 in the oven 20. Optionally, the first discharge conveyor 36 passes under the second press 32. The second press 32 may be elevated to accommodate passage of the first discharge conveyor 36 underneath.

In an embodiment of the present invention, the first press conveyor 34 stops as the first press 30 compresses the units of dough, then restarts and moves the pressed pieces to the first discharge conveyor 36 which moves continuously at a constant speed. The stopping and starting of the first press conveyor 34 leaves gaps between groups of pieces on the first discharge conveyor 36.

The second press 32 also presses the objects into pressed pieces. The second press passes the pressed pieces along a second transport conveyor, in this case a second press conveyor 40. The second press conveyor 40 passes the pressed pieces onto a second discharge conveyor 42. The second discharge conveyor 42 directs the pieces onto the oven conveyor 38 in the oven at a point adjacent to the discharge end of the first discharge conveyor 36.

Conveyors usable as the press and discharge conveyors may include endless belts. The endless belts may be formed of any desired construction and materials. One example is disclosed in U.S. Pat. No. 5,231,919 for "Conveyor Belt for Dough Ball Pressing apparatus," which is incorporated herein by reference.

In an embodiment of the present invention, the second press conveyor 40 stops as the second press compresses the units of dough, then restarts and moves the pressed pieces to the second discharge conveyor 42. Intermittently, the second discharge conveyor 42 pivots between an upper position and a lower position, and at appropriate intervals the pieces are received onto the second discharge conveyor from the second press conveyor.

Pieces from the first discharge conveyor 36 pass under the second discharge conveyor 42 and are loaded onto the oven conveyor 38. At a point corresponding to a time when pieces from the first discharge conveyor 36 are not depositing onto the oven conveyor, the second discharge conveyor 42 is placed in a lower position and pieces are unloaded from the second discharge conveyor onto the oven conveyor. As seen in FIG. 2 and FIG. 3, both the first and second discharge conveyors 36, 42 deliver pieces in near proximity on the oven conveyor 38.

With reference to FIG. 3, in an embodiment, the second discharge conveyor 42 is driven continuously by a drive roller 44 having a longitudinal drive axis. The second discharge conveyor 42 is rotatable around the longitudinal drive axis to reach the upper and lower positions. The second discharge conveyor is moved between the upper and the lower positions by a pivoting means 46. In an embodiment of the present invention, the pivoting means is an extendable linear actuator 48 controlled by the logic controller 28. An end of the linear actuator 48 is coupled to a first end of a lever 50. A second end of the lever 50 is coupled to a rotatable axle 52, such that upon movement of the lever 50 by the linear actuator 48, the lever 50 causes the axle 52 to rotate. Two control arms 54 are coupled to the axle 52, one of the control arms being coupled to each side of the second discharge conveyor 42. Upon extension of the linear actuator 48, the control arms 54 raise or lower the second discharge conveyor 42. Other pivoting means 46 will be apparent to one skilled in the art in connection with this disclosure.

In the lower position, the second discharge conveyor is pivoted about the longitudinal axis such that the discharge ends of the first discharge conveyor and the second discharge conveyor are adjacent. This will be a point where the discharge end of the second discharge conveyor is sufficiently close to the discharge end of the first conveyor so that pieces from the two discharge conveyors are deposited in near proximity on the oven conveyor, without need for synchronization with the oven conveyor. In the upper position the discharge ends of the first discharge conveyor and the second discharge conveyor need only be spaced apart sufficiently to accommodate the first pieces therebetween.

The second discharge conveyor 42 may be maintained at a constant speed in both the upper and lower positions and while pivoting. Alternatively, the speed of the second discharge conveyor 42 may be varied as necessary to synchronize with the first discharge conveyor 36 and the pivoting motion.

The timing of the first press 30 and the second press 32, the speeds of the first press conveyor 34, the second press conveyor 40, the first discharge conveyor 36, the second discharge conveyor 42 and the pivoting of the second discharge conveyor 42 are set by the logic controller 28 so as to synchronize the discharge of pieces onto the oven conveyor. The speed of the oven conveyor, however, is adjustable without reference to the timing of the first or second press and without reference to the speed of the first press, first discharge, second press, or second discharge conveyors. The only requirement of the oven conveyor is that the oven conveyor be moving at a minimum speed which is fast enough to off-load pieces from the discharge conveyors without the pieces overlapping. Beyond the minimum speed, the oven conveyor speed may be increased or decreased as desired to alter, for example, the amount of time the pieces spend in the oven. Therefore, synchronization between the discharge conveyors and a deposit conveyor is not required.

Considering the delivery of the pieces to the oven further, the first discharge conveyor delivers a group of pieces from the first press onto the oven conveyor. After the group of pieces from the first discharge conveyor ends, the second discharge conveyor descends to the lower position and delivers a group of pieces from the second press to the oven conveyor. After the group of pieces from the second discharge conveyor ends, the second discharge conveyor rises to the upper position and the first discharge conveyor again delivers a group of pieces from the first press. The process then continues placing a nearly continuous stream of pieces onto the oven conveyor.

The present system also allows the second discharge conveyor 42 to be moved into the upper position to help remove jams or fix problems occurring between the first discharge conveyor 36 and the oven conveyor 38.

Those skilled in the art will recognize that the production line system described herein may be used in other systems, besides those used with tortillas. For example, the production line system described herein may be used for making other types of food items. Additionally, for example, the production line system may be used in cooling systems and assembly systems that utilize cyclical components such as presses, molds or shears. Additionally, as will be recognized by those skilled in the art, the present system can be expanded to utilize more than two presses or other cyclical components.

The apparatus described herein can be used for combining delivery of first objects from a first transport conveyor with second objects from a second transport conveyor. Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except a combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. An apparatus for combining delivery of first objects from a first transport conveyor (34) with second objects from a second transport conveyor (40), comprising:
    a first continuous discharge conveyor (36) for transporting the first objects received from the first transport conveyor, the first continuous discharge conveyor comprising a discharge end;
    a second continuous discharge conveyor (42) for receiving the second objects from the second transport conveyor, the second continuous discharge conveyor comprising a receiving end with a longitudinal axis, and a discharge end, and being rotatable about the longitudinal axis;
    means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and
    means for synchronizing the pivoting means with discharge of the first objects from the first discharge conveyor and discharge of the second objects from the second discharge conveyor.

2. An apparatus for combining delivery of first objects from a first transport conveyor (34) with second objects from a second transport conveyor (40), comprising:
    a first continuous discharge conveyor (36) for transporting the first objects received from the first transport conveyor, the first continuous discharge conveyor comprising a discharge end;
    a second continuous discharge conveyor (42) for receiving the second objects from the second transport conveyor, the second continuous discharge conveyor comprising a receiving end with a longitudinal axis, and a discharge end, and being rotatable about the longitudinal axis;
    means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and
    means for synchronizing the pivoting means with discharge of the first objects from the first discharge conveyor and discharge of the second objects from the second discharge conveyor;
    wherein the synchronizing means comprises a logic controller (28).

3. An apparatus for combining delivery of first objects from a first transport conveyor (34) with second objects from a second transport conveyor (40), comprising:
    a first continuous discharge conveyor (36) for transporting the first objects received from the first transport conveyor, the first continuous discharge conveyor comprising a discharge end;
    a second continuous discharge conveyor (42) for receiving the second objects from the second transport conveyor, the second continuous discharge conveyor comprising a receiving end with a longitudinal axis, and a discharge end, and being rotatable about the longitudinal axis;
    means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and
    means for synchronizing the pivoting means with discharge of the first objects from the first discharge conveyor and discharge of the second objects from the second discharge conveyor;
    wherein the first objects and second objects are pressed dough, and the first and second transport conveyors are pressed dough conveyors.

4. The apparatus of claim 3 wherein the pressed dough objects are tortillas.

5. A system for pressing tortillas comprising:
a first tortilla press (30) for pressing dough into first tortillas, having a first press conveyor (34);
a first continuous discharge conveyor (36) for transporting the first tortillas received from the first press conveyor, comprising a discharge end;
a second tortilla press (32) for pressing dough into second tortillas, having a second press conveyor (40);
a second continuous discharge conveyor (42) for receiving the second tortillas from the second press conveyor, comprising a receiving end with a longitudinal axis, and a discharge end, and being rotatable about the longitudinal axis;
means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and
means for synchronizing the pivoting means with the first press conveyor, the first discharge conveyor, the second press conveyor, and the second discharge conveyor.

6. A method for combining delivery of first objects from a first transport conveyer (34) with second objects from a second transport conveyor (40) comprising the steps:
receiving the first objects from the first transport conveyor onto a first continuous discharge conveyor (36) having a discharge end;
receiving the second objects from the second transport conveyor onto a second continuous discharge conveyor (42) comprising a receiving end with a longitudinal axis, and a discharge end;
intermittently pivoting the second continuous discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween,
synchronizing the pivoting of the second continous discharge conveyor with the first discharge conveyor and the second discharge conveyor;
discharging the first objects from the first discharge conveyor while the second discharge conveyor is in the upper position, and discharging the second objects from the second discharge conveyor while the second discharge conveyor is in the lower position.

7. The method of claim 6 wherein the first objects and second objects are pressed dough, and the first and second transport conveyors are press conveyors.

8. An apparatus for combining delivery of first objects from a first transport conveyor with second objects from a second transport conveyor, comprising:
a first continuous discharge conveyor for transporting the first objects received from the first transport conveyor, the first continuous discharge conveyor comprising a discharge end;
a second continuous discharge conveyor for receiving the second objects from the second transport conveyor, the second continuous discharge conveyor comprising a receiving end with a longitudinal axis, and a discharge end, and being rotatable about the longitudinal axis;
means for pivoting the second discharge conveyor about the longitudinal axis between a lower position in which the discharge ends of the first discharge conveyor and the second discharge conveyor are adjacent, and an upper position in which the discharge ends of the first discharge conveyor and the second discharge conveyor are spaced apart sufficiently to accommodate the first objects therebetween; and
means for synchronizing the pivoting means with discharge of the first objects from the first discharge conveyor and discharge of the second objects from the second discharge conveyor;
wherein the pivoting means comprises a linear actuator.

9. The apparatus of claim 8 wherein the synchronizing means comprises a logic controller.

10. The apparatus of claim 8 wherein the first objects and second objects are tortillas, and the first and second transport conveyors are tortilla press conveyors.

11. An apparatus for combining delivery of first objects from a first transport conveyor with second objects from a second transport conveyor, comprising:
a continuous receiving conveyor; a first continuous discharge conveyor for transporting the first objects received from the first transport conveyor to the receiving conveyor, the first continuous discharge conveyor comprising a discharge end;
a second continuous discharge conveyor for transporting the second objects received from the second transport conveyor to the receiving conveyor, the second continuous discharge conveyor comprising a receiving end with a longitudinal axis, and a discharge end, and being rotatable about the longitudinal axis;
means for pivoting the second discharge conveyor about the longitudinal axis between a lower position in which the discharge end of the second discharge conveyor is adjacent to the receiving conveyor and an upper position in which the discharge end of the second discharge conveyor is spaced apart from the receiving conveyor sufficiently to accommodate the first objects therebetween; and
means for synchronizing the pivoting means with discharge of the first objects from the first discharge conveyor and discharge of the second objects from the second discharge conveyor.

* * * * *